UNITED STATES PATENT OFFICE.

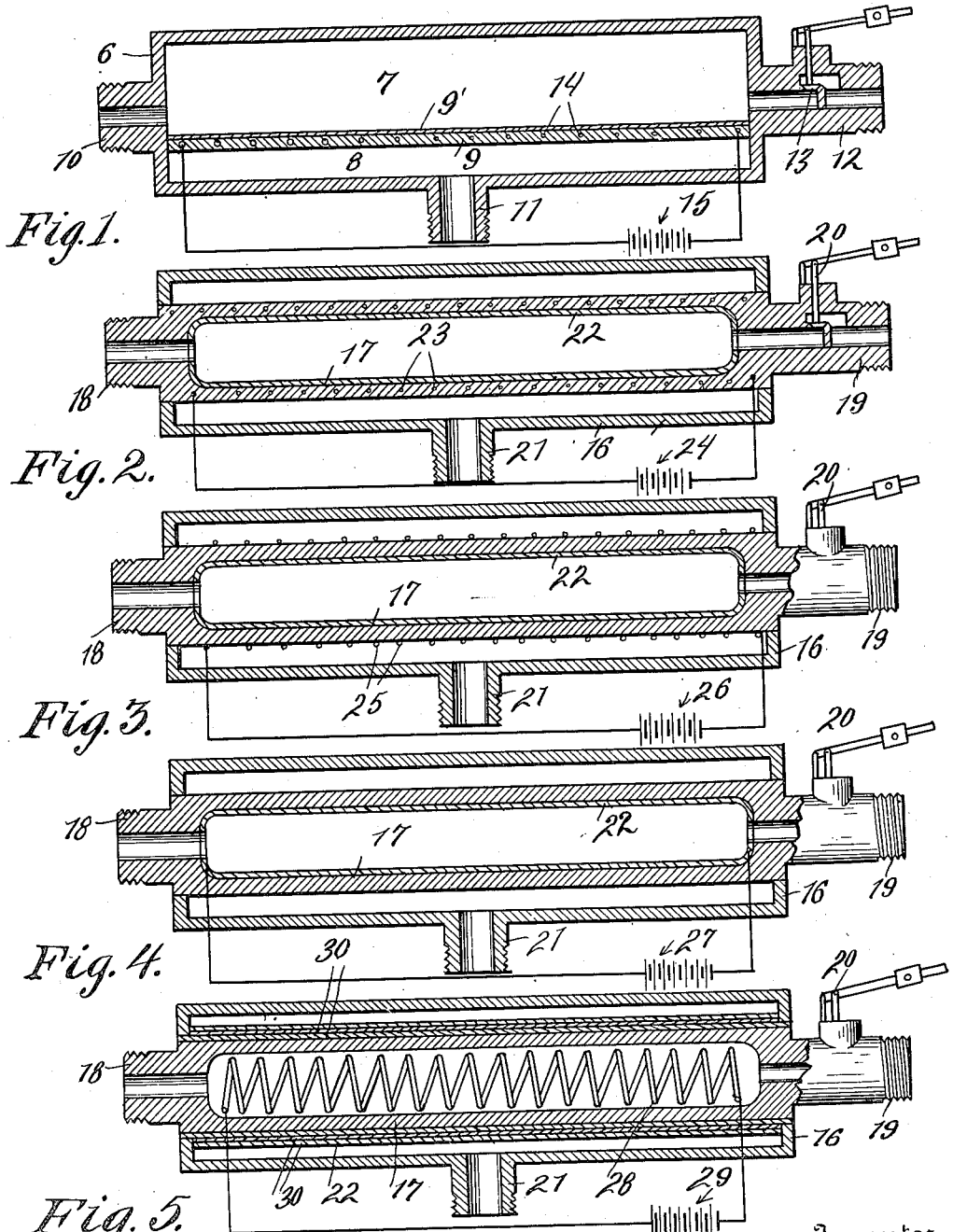

WALTER O. SNELLING, OF PITTSBURGH, PENNSYLVANIA.

APPARATUS FOR SEPARATING GASES.

1,174,631.  Specification of Letters Patent.  Patented Mar. 7, 1916.

Application filed September 17, 1914. Serial No. 862,243.

*To all whom it may concern:*

Be it known that I, WALTER O. SNELLING, a citizen of the United States, residing at Pittsburgh, in the county of Allegheny and State of Pennsylvania, have invented certain new and useful Improvements in Apparatus for Separating Gases, of which the following is a specification.

This invention relates to apparatus for the separation of gases and particularly the separation of hydrogen from a gaseous mixture containing the same, such for example, as producer gas or the like.

If certain gases, notably hydrogen, are brought into contact with a very thin sheet or film of platinum or palladium, maintained at an elevated temperature and preferably at a bright red heat, such gases will be taken up or absorbed by the platinum or palladium and will be released from the other side of the sheet or film if the degree of concentration of hydrogen in the gas in contact therewith is less than the degree of concentration of hydrogen in the gaseous mixture to be separated. If the gaseous mixture, such as producer gas, contains, for example, 20 per cent. of hydrogen and the gas, such as air, on the opposite side of the heated film or sheet contains no hydrogen the hydrogen will pass from the gaseous mixture into the space on the opposite side of such film or sheet until the degree of concentration of hydrogen in such space will approach or substantially equal the degree of concentration of hydrogen in the gaseous mixture. If the hydrogen released from the film or sheet be conducted away the removal of hydrogen from the gaseous mixture may be effected in a continuous, practical and highly economical manner. The gaseous mixture under treatment is rendered practically free from hydrogen and such removed hydrogen may be used to effect chemical reaction such as those resulting from the action of hydrogen at elevated temperatures or for other purposes.

In the preferred practice of the invention, I provide a porous support, such as porous earthen ware or alundum, upon which is mounted or to which is applied, a thin sheet, film or coating of platinum or palladium. The function of the porous support is solely to support, reinforce or stiffen the metal sheet or film to prevent the same from being bent, distorted, broken, or otherwise injured by the pressure of the gas against it. Means are provided to supply the gas, which may advantageously be a hydrogen carrying gas, as producer gas, to one side of the sheet or film. Means preferably electrical, are also provided to heat the sheet or film to the temperature most favorable to the described action.

In the accompanying drawings forming a part of this specification and in which like numerals are employed to designate like parts throughout the same, Figure 1 is a central longitudinal sectional view through one form of the apparatus, Fig. 2 is a similar view through a different form of the apparatus, Fig. 3 is a similar view through a different form of the apparatus, Fig. 4 is a similar view through a different form of the apparatus, and, Fig. 5 is a similar view through a still different form of the apparatus.

In Fig. 1, the numeral 6 designates a main shell or casing, divided into two compartments 7 and 8 by a longitudinally extending strip or partition 9, which is preferably formed of porous earthen ware or alundum. Disposed upon one side of the partition 9, preferably upon the upper side thereof, is a thin imperforate sheet or film of platinum or palladium 9'. This sheet or film is very thin, preferably not materially exceeding one thousandth of an inch in thickness, and is advantageously produced by electrolytically depositing the platinum or palladium upon a sheet of copper or the like, which latter metal is subsequently removed by dissolving the same in a suitable solvent. The gaseous mixture to be separated, such as producer gas, is introduced into one end of the chamber 7 through an inlet pipe 10, the hydrogen content of the mixture being absorbed by the sheet or film 9' and released or given off into the chamber 8, the same passing outwardly therefrom through a pipe 11. The gas which remains after the removal of the hydrogen, is discharged through a pipe 12, the passage of such gas being controlled by a pressure relief valve 13 or any other suitable means. Extending within and through the material of the porous partition or support 9 is a heat generating or resistance coil 14, having connection with a suitable source of electric current 15.

Each form of the apparatus shown in

Figs. 2 to 5 inclusive comprises a main outer shell or casing 16, receiving an inner tube 17, which is much smaller in diameter and is preferably concentrically arranged therein in spaced relation thereto. The tube 17 is preferably formed of porous earthen ware or alundum. The tube 17 is provided at one end with an inlet pipe 18 and at its opposite end with an outlet pipe 19, the passage of the gas therethrough being controlled by a pressure relief valve 20 or any other suitable means. The outer shell 16 is provided between its ends with an outlet pipe 21. In each form of the apparatus shown in Figs. 2 to 4 inclusive, a very thin tube or cylinder 22 of platinum or palladium is disposed within the tube 17. This tube of platinum or palladium is advantageously formed by electrolytic deposition, as explained in connection with the form of my apparatus shown in Fig. 1. In Fig. 5, I have shown this tube or cylinder 22 arranged upon the exterior surface of the tube 17.

In Fig. 2, heating means are provided including a heating or resistance coil 23, which is arranged within the material of the tube 17, the same being suitably connected with a suitable source of current 24. In Fig. 3, a heating or resistance coil 25 surrounds the tube 22 and is connected with a suitable source of current 26. In Fig. 4, the tube or cylinder of platinum or palladium is shown as being directly connected with the source of current 27, the resistance of the metal sheet or film causing a suitable evolution of heat. In Fig. 5, a heating or resistance coil 28 is disposed within the tube 22, the same being connected with a source of electric current 29. The forms of apparatus which have the tubular cylindrical platinum or palladium elements are preferred, as they offer a greater contact area between the same and the hydrogen or similar gas.

I have found that the thin sheets or films of platinum or palladium employed in the practice of my process sometimes acquire a rough appearance as though they had been subjected to chemical action. For this reason, and to prevent distortion and leakage, I may advantageously apply a thin coating of plastic alundum or alundum cement to one or both sides of the metal film or sheet, as indicated at 30 in Fig. 5.

In carrying out the process, the gaseous mixture to be separated is introduced upon one side of the platinum or palladium under any desired pressure, but preferably exceeding atmospheric pressure and preferably exceeding that upon the opposite side of the platinum or palladium. The temperature maintained in the apparatus may be widely varied but it should preferably be above 800° C.

I have obtained the best results in the practice of my process by using thin sheets or films of platinum or palladium but any material permeable to hydrogen at an elevated temperature may be employed. Some measure of success can be obtained by using various other catalytic metals or metals recognized as having catalytic activity, such as nickel, cobalt, and iron, and while I prefer to employ platinum it is to be understood that catalytic metals, notably palladium, nickel, cobalt, and iron are contemplated as equivalents of platinum for use in my process.

While I have described the preferred forms of my apparatus and the preferred practice in making use of the same, it is to be understood that equivalents may be employed and details of construction and procedure widely varied and that my invention is not restricted to such preferred forms of apparatus and preferred practice, except as particularly set forth in the subjoined claims.

Having thus described my invention, I claim:—

1. The herein described means for the separation of hydrogen from a gaseous mixture containing the same, comprising a very thin imperforate film of material permeable to hydrogen at an elevated temperature but impermeable thereto when cold, a porous support to which the film is applied throughout substantially its entire area, means to heat the sheet or film and means to bring a gaseous mixture into contact with one surface of such film.

2. The herein described means for the separation of hydrogen from a gaseous mixture containing the same, comprising an imperforate film of metal permeable to hydrogen at an elevated temperature, such film being not materially over one thousandth of an inch in thickness, means to heat the film and means to bring a gaseous mixture into contact with one surface of such film.

3. The herein described means for the separation of hydrogen from a gaseous mixture containing the same, comprising an imperforate film of metal permeable to hydrogen at an elevated temperature, such film being not materially over one thousandth of an inch in thickness, a porous support therefor to which the film is applied throughout substantially its entire area, means to heat the film and means to bring a gaseous mixture into contact with one surface of such film.

4. The herein described means for the separation of hydrogen from a gaseous mixture containing the same, comprising an imperforate film of platinum not materially over one thousandth of an inch in thickness, a porous support therefor to which the film is applied throughout substantially its entire area, means to heat the film, means to bring a gaseous mixture into contact with one surface of such film and means to receive and conduct away hydrogen given off from the opposite surface of such film.

5. The herein described means for the separation of hydrogen from a gaseous mixture containing the same, comprising a very thin imperforate film of metal permeable to hydrogen at an elevated temperature, a porous body supporting the same, and a protecting coating of porous material applied to one or both surfaces of the film.

6. The herein described means for the separation of hydrogen, from a gaseous mixture containing the same, comprising an imperforate film of metal permeable to hydrogen at an elevated temperature the film being not materially over one thousandth of an inch in thickness and such film being in the form of a tube, means to heat the film and means to bring a gaseous mixture into contact with one surface of said film.

7. The herein described means for the separation of hydrogen from a gaseous mixture containing the same, comprising a thin tube of platinum not materially over one thousandth of an inch in thickness, a porous tube supporting the same throughout substantially its entire area, means to heat the same, means to bring a gaseous mixture into contact with one surface of the platinum tube and means to receive and conduct away hydrogen given off from the opposite surface of such tube.

8. The herein described means for the separation of hydrogen from a gaseous mixture containing the same, comprising a very thin tube of electrolytically deposited metal permeable to hydrogen at an elevated temperature, a porous tube supporting the same throughout substantially its entire area, means to heat the metal tube, means to bring a gaseous mixture into contact with one surface of said tube and means to receive and conduct away hydrogen given off from the opposite surface of such tube.

9. The herein described means for the separation of hydrogen from a gaseous mixture containing the same, comprising a very thin film of metal permeable to hydrogen at an elevated temperature, a porous support therefor, electrical means supported by said porous support to heat the film, means to bring a gaseous mixture into contact with one surface of the film and means to receive and conduct away the hydrogen given off from the opposite surface of such film.

10. The herein described means for the separation of hydrogen from a gaseous mixture containing the same, which comprises a tube of platinum not materially over one thousandth of an inch in thickness, a porous tube supporting the platinum tube throughout substantially its entire area, means to prevent the injury or distortion of the platinum tube applied to one or both surfaces thereof, said means being porous, electrical means within the porous support to heat the platinum tube, means to bring the gaseous mixture into contact with one surface of said platinum tube, and means to receive and conduct away hydrogen given off from the opposite surface of such tube.

In testimony whereof I affix my signature in presence of two witnesses.

WALTER O. SNELLING.

Witnesses:
KATHERINE KELLY,
M. R. McKEOWN.